Dec. 20, 1966  J. JOHNSON  3,292,862
IRRIGATION SYSTEM
Filed July 31, 1964  3 Sheets-Sheet 1
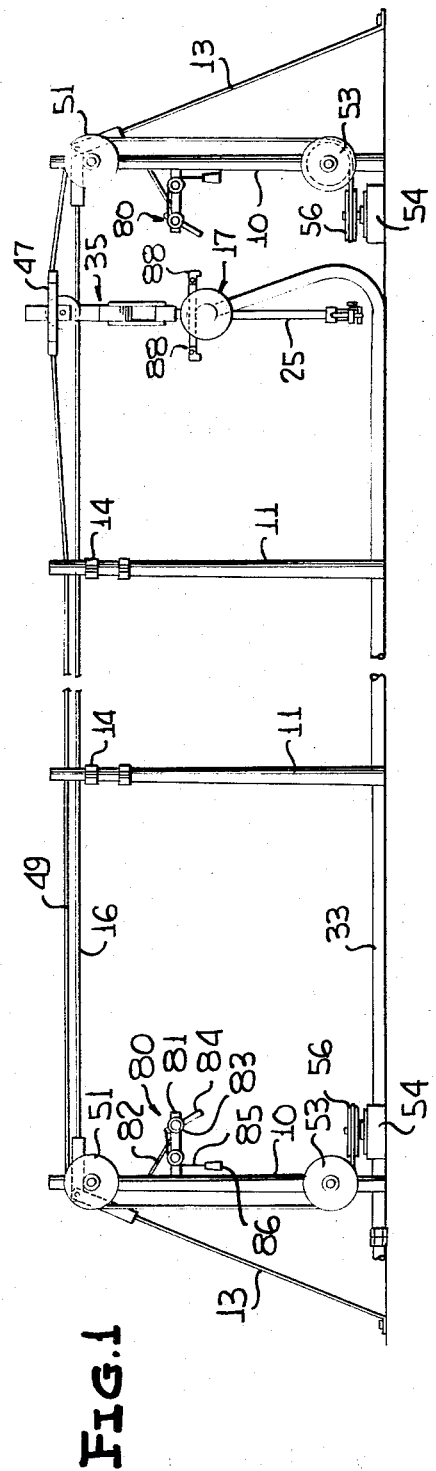
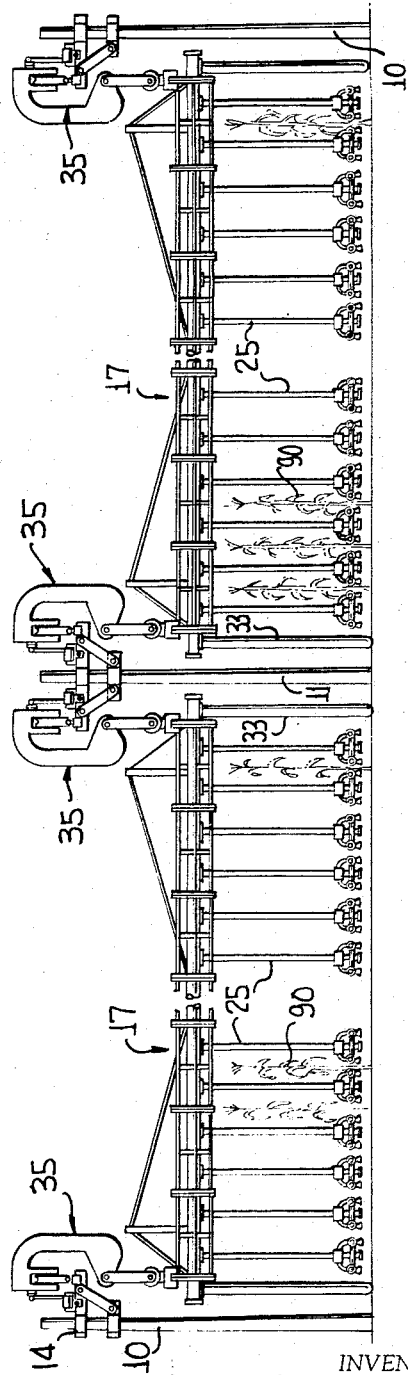
INVENTOR
JOHN JOHNSON
BY Chas R Allen
ATTORNEY

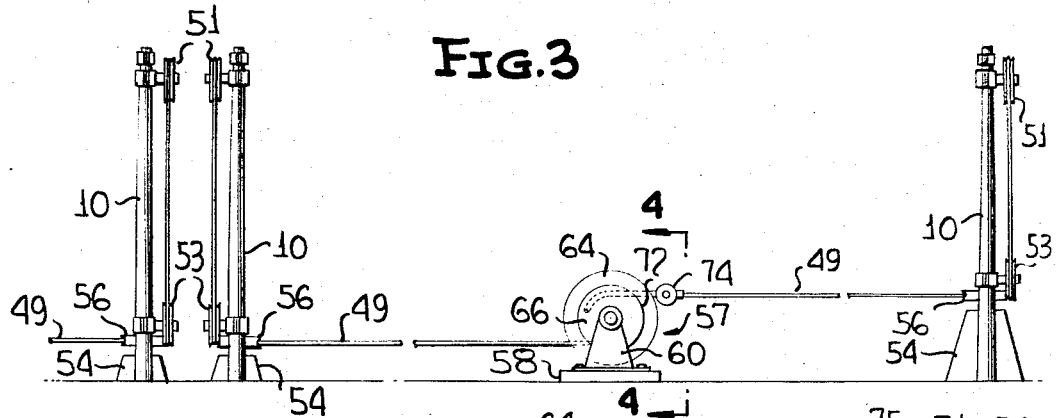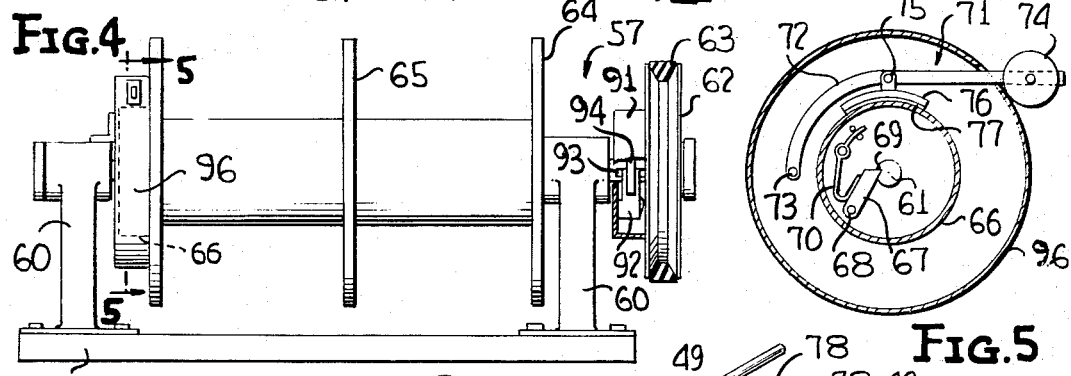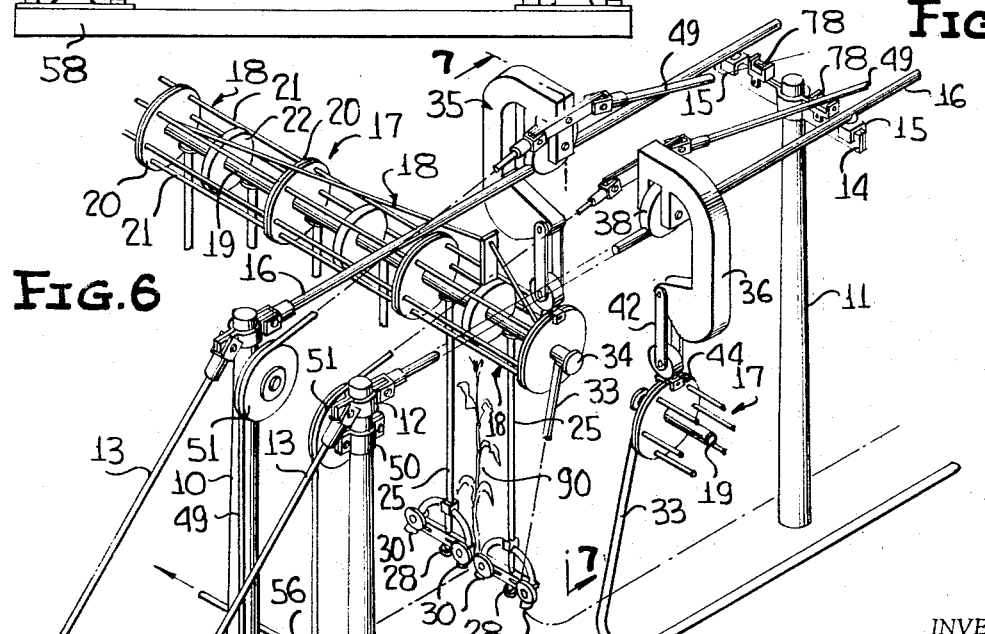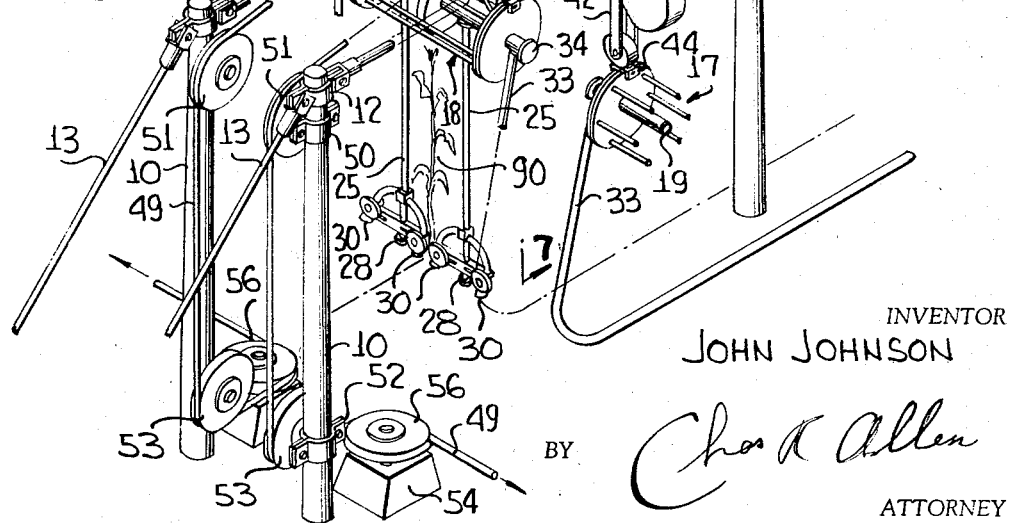

Dec. 20, 1966 J. JOHNSON 3,292,862
IRRIGATION SYSTEM
Filed July 31, 1964 3 Sheets-Sheet 3
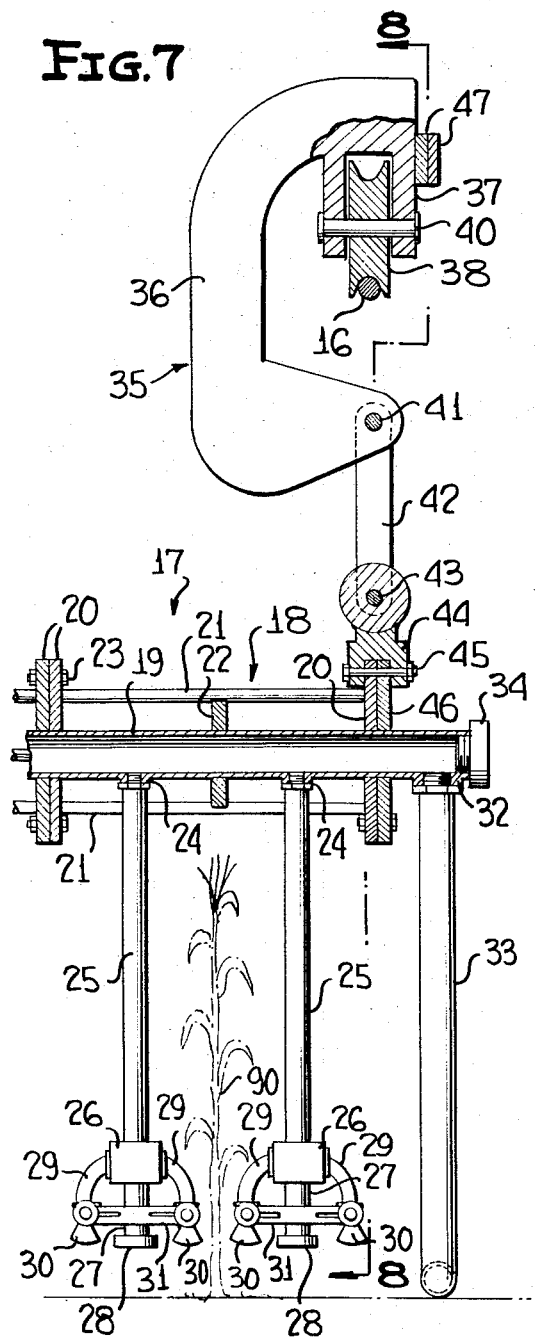
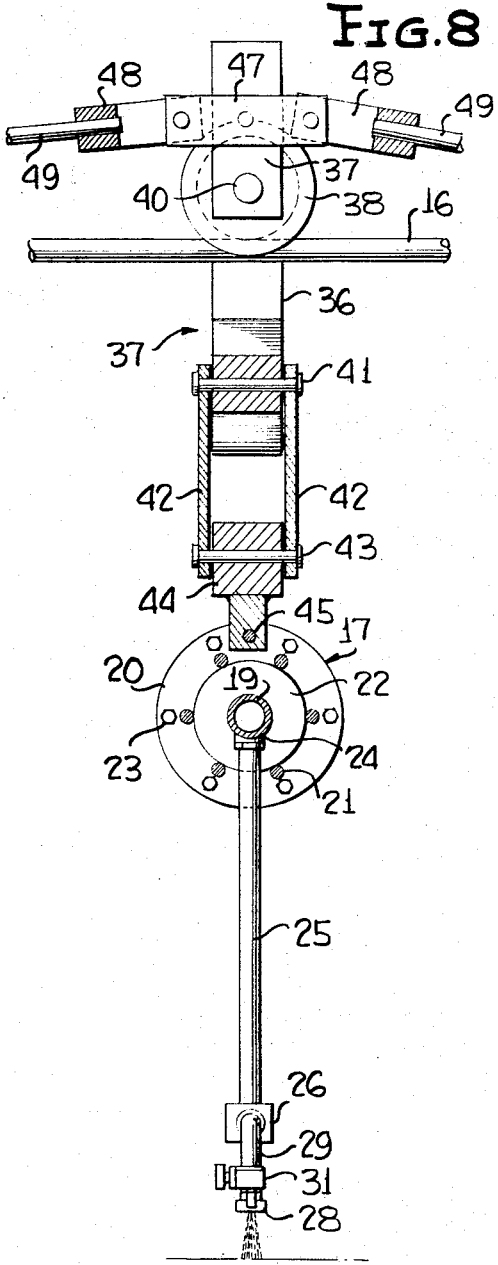
INVENTOR
JOHN JOHNSON
BY Chas R Allen
ATTORNEYS – # United States Patent Office 3,292,862
Patented Dec. 20, 1966

3,292,862
IRRIGATION SYSTEM
John Johnson, 4105 N. McDonald Road,
Spokane, Wash. 99216
Filed July 31, 1964, Ser. No. 386,513
2 Claims. (Cl. 239—185)

This invention relates in general to new and useful improvements in irrigation systems, and more specifically to a novel irrigation system which is particularly designed for irrigating a standing crop without damage to the plants thereof.

In the conventional irrigation system, water is indiscriminately supplied to a field. As a result, the heavy sprays of water strike against the plants and restrict the times when irrigation can be accomplished. For example, when the plants are in bloom, heavy sprays of water cannot strike the plants, otherwise the buds will be broken therefrom.

In view of the foregoing, it is the primary object of this invention to provide a novel irrigation system which will directly irrigate the ground between plants arranged in rows.

Another object of this invention is to provide a novel irrigation system which is of the overhead type and which is provided with suitable spray means for directing spray towards the ground between plants in adjacent rows.

Another object of this invention is to provide a novel irrigation system which is automatic in operation and which is of an extremely simple construction whereby it is economically feasible.

A further object of this invention is to provide a novel drive for an irrigation system which includes multiple drive units, each drive unit being particularly adapted to move the spray assembly of the irrigation system in one direction only, and each drive unit having a novel break and ratchet arrangement.

This invention is an improvement on my invention disclosed in my Patent No. 3,093,312 of June 11, 1963.

With the above and other objects in view that will hereinafter appear, the nature of the invention will be more clearly understood by reference to the following detailed description, the appended claims and the several views illustrated in the accompanying drawings:

In the drawings:

FIGURE 1 is a side elevational view of my irrigation system and shows the general details thereof.

FIGURE 2 is an end view of my irrigation system and shows further the details thereof.

FIGURE 3 is a fragmentary end view of the irrigation system with the spray booms omitted for purposes of clarity.

FIGURE 4 is an enlarged fragmentary elevational view of a drive unit of the spray system, the view being taken generally along the line 4—4 of FIGURE 3.

FIGURE 5 is an enlarged fragmentary vertical sectional view taken along the line 5—5 of FIGURE 4 and shows the specific details of the ratchet drive and break unit of the drive unit.

FIGURE 6 is an enlarged fragmentary perspective view showing the specific details of mounting and driving the spray booms of the irrigation system.

FIGURE 7 is an enlarged fragmentary vertical sectional view taken along the line 7—7 of FIGURE 6 and shows more specifically the details of mounting of the spray booms and the relationship of the spray heads with respect to plants.

FIGURE 8 is an enlarged fragmentary vertical sectional view taken along the line 8—8 of FIGURE 7 and shows further the details of the mounting of the spray booms.

Referring now to the drawings in detail, it will be seen that there is illustrated a two section irrigation system formed in accordance with my invention. Although only two sections have been illustrated, it is to be understood that more than two sections may be utilized at one time or, if desired, only one section may be utilized. When two or more sections are utilized at a time, intermediate supports may serve a double function as will be apparent hereinafter.

Each section of the irrigation system includes two rows of supports and each row of supports includes a pair of terminal supports 10 and a plurality of longitudinally intermediate supports 11, as is generally shown in FIGURE 1. Referring now to FIGURE 6 in particular, it will be seen that each terminal support 10 is suitably anchored in the ground and is provided at the upper end thereof with a clamp type fitting 12 which extends longitudinally of the row of supports. To the remote end of the fitting 12 there is connected a guide wire 13 which is suitably anchored in the ground to prevent the movement of the upper end of the terminal support 10 towards the remote terminal support.

Each longitudinally intermediate support 11 is provided at the upper end thereof with a cross bar 14. When the support 11 is in an outer row, the cross bar 14 extends to one side only. On the other hand, as is clearly shown in FIGURE 6, when the support 11 is in an intermediate row, the cross bar 14 extends to both sides thereof. Also, it is to be noted that while the supports 11 may simultaneously serve dual functions, two terminal supports 10 are provided at each end of the system for each intermediate row of supports.

At the outer end of each cross bar 14 there is provided an anchor 15 which, in turn, has secured thereto a track member 16. Each track member 16 is anchored at its ends to the fittings 12 carried by the terminal supports 10. Thus, the track members 16 are adequately supported. Each section of the irrigation system will be provided with two of the track members 16 arranged in spaced parallel relation.

A spray boom, generally referred to by the numeral 17, generally extends between and is suspended from each pair of track members 16. In accordance with this invention, each spray boom 17 is formed of a plurality of individual boom sections 18 which are interconnected. The boom sections 18 are mounted on an elongated length of pipe 19 and each boom section 18 includes a pair of spaced plates 20 which have circumferentially spaced reinforcing rods 21 extending therebetween. Each boom section 18 also includes an intermediate plate 22 which is mounted on the pipe 19 and which is secured to central portions of the reinforcing rods 21 to stiffen the same. The plates 20 of adjacent boom sections 18 are suitably secured together by bolts 23, as is clearly shown in FIGURE 7.

The pipe 19 is provided at spaced intervals with downwardly facing fittings 24 (FIGURE 7) to which there are attached depending spray pipes 25. Each spray pipe 25 is provided adjacent the lower end thereof with a splitter fitting 26 which divides the flow of water to a centrally located, downwardly directed pipe section 27 which is provided at the lower end thereof with a spray head 28, and to a pair of outer pipe sections 29 which are provided at the lower ends thereof with adjustable spray nozzles 30. A strap 31 connects together the lower portions of the pipe sections 27 and 29.

It is also to be noted that one end of the pipe 19 is provided with a suitable inlet fitting 32 to which there is connected a water supply hose 33. The ends of the pipe 19 are closed by means of suitable caps 34.

The ends of the spray booms 17 are supported from the track member 16 by means of hangers which are generally referred to by the numeral 35. Each hanger 35 includes a generally C-shaped hanger member 36 which is provided with a bifurcated upper portion 37 in which a roller or wheel 38 is mounted for rotation on a transversely extending shaft 40. The lower end of each hanger member 36 is provided with a longitudinal pin 41 on which a pair of depending straps 42 are pivotally mounted. The lower ends of the straps 42 are connected by means of a second longitudinal pin 43 to a fitting 44 which has a bifurcated lower portion carrying a bolt 45. The extreme end section 18 has secured to the end plate 20 thereof an additional plate 46, and the plate 20 and the plate 46 are received in the bifurcated lower end of the fitting 44 and clamped therein by the bolt 45.

From the foregoing, it will be readily apparent that the spray booms 17 are adequately supported for movement along the associated track members 16. In order that the spray booms 17 may automatically be reciprocated, each hanger member 36 is provided on the upper part thereof with bars 47. The bars 47 have secured to the opposite ends thereof bifurcated fittings 48 which are carried by by terminal ends of cables 49.

The upper portion of each terminal support 10, as is clearly shown in FIGURE 6, is provided with a second clamp fitting 50. The clamp fitting 50 carries an upper pulley 51. Another clamp fitting 52 is carried by each terminal support 10 adjacent the lower end thereof, and the clamp fitting 52 carries a lower pulley 53 which is aligned with the pulley 51.

A mounting block 54 is mounted in the ground adjacent the base of each of the terminal supports 10. Each mounting block 54 carries a horizontally disposed pulley 56 which is generally aligned with the lower part of the associated pulley 53.

Referring now to FIGURE 3 in particular, it will be seen that between each pair of transversely aligned terminal supports 10 there is mounted a drive unit which is generally referred to by the numeral 57. Each drive unit 57, as is clearly shown in FIGURE 4, is mounted on a suitable base 58 and includes a pair of upstanding supports 60. A drive shaft 61 is rotatably journalled in the supports 60 and on one end of the drive shaft 61 there is mounted a drive pulley 62 which may be connected to any suitable type of power source (not shown) by means of a drive belt 63.

The drive pulley 62 is rotatable about the drive shaft 61 and has attached thereto a drum 91. Within the drum 91 and attached thereto for pivotal movement, is a dog 92 which is seatable in a notch 93 in the shaft 61. The dog 92 is resiliently urged into interlocking engagement with the shaft 61 by means of a spring 94. It will be readily apparent that the pulley 62 is connected to the shaft 61 for driving the shaft 61 in one direction only, this being a counterclockwise direction, as viewed in FIGURE 3.

The drive shaft 61 carries a drum 64. The drum 64 is provided with a central divider 65 so as to receive separately two cables.

At the end of the drum 64 remote from the drive pulley 62 there is a second drum or housing 66 which is rotatably journalled on the shaft 61. The housing 66 carries a dog 67 which is pivotally mounted on a pin 68 and is engageable in a notch 69 formed in the drive shaft 61. A suitable spring 70 urges the dog 67 into the notch 69 so that when the cables 49 are being paid off of the drum 64, the housing 66 is driven by the rotating drive shaft 61. The rotation of the housing 66 is retarded by means of a brake assembly 71 which is best shown in FIGURE 5. The brake assembly 71 includes a curved arm 72 which is pivotally connected to an outer housing 96 by means of a pivot pin 73. The arm 72 extends through the housing 96 and is provided at the outer end thereof with an adjustable weight 74 which exerts a downward pressure on the arm 72. An intermediate part of the arm 72 has pivotally mounted thereon by means of a pivot pin 75 a brake member 76 having a brake shoe 77 which engages the drum or housing 66. The outer housing 96 is suitably anchored on the adjacent one of the supports 60 against rotation.

From the foregoing, it will be readily apparent that the drum 64 is driven in a counterclockwise direction to reel in the cables 49, and since each unit includes two of the drums 64, when the apparatus is being moved in the opposite direction, the drum not being driven rotates in a clockwise direction to pay out the cables. This paying out of the cables is retarded by the brake assembly 71.

It will be readily apparent from the foregoing description that there is connected to each of the booms 17 four of the cables 49 with the cables 49 extending in opposite directions from the booms 17. Two of the cables are reeled on each of the drums 64. In order to prevent the unnecessary wearing of cables 49 against the cross bars 14, each cross bar 14 is provided in alignment with each cable 49 with a guide roller 78, as is best shown in FIGURE 6.

Referring now to FIGURE 1 once again, it will be seen that mounted on certain of the terminal supports 10 of each transverse pair is a switch assembly, generally referred to by the numeral 80. The switch assembly 80 includes a suitable support 81 which is braced by a diagonal brace 82. The support 81 carries a rotatable switch 83 having an operating arm 84 which is engageable by a portion of an associated spray boom 17. The switch 83 is of a ratchet type and has attached thereto a return cable 85 which is automatically actuated by means of a weight 86. If desired, the spray boom 17 may be provided with a suitable set of switch actuating arms 88.

It is to be understood that when a crop is being planted, the rows of the crop will be spaced in accordance with the spacing of the spray heads carried by the booms 17. Then as the crop grows, the individual plants 90 in the rows will be positioned between the spray heads of the booms 17, as it clearly illustrated in FIGURE 7. By so positioning the plants 90 with respect to the spray heads of the spray booms, it will be readily apparent that the plants 90 may be irrigated during all stages of the growth thereof without there being any possibility whatsoever of damage to the plants.

Although only a preferred embodiment of the invention has been specifically illustrated and described here, it is to be understood that minor variations may be made therein within the spirit and scope of the invention, as defined by the appended claims.

I claim:
1. An irrigation system comprising a pair of spaced track members, support means supporting said track members, a spray boom, hangers suspending opposite ends of said spray boom from said track members, drive means connected to said hangers for reciprocating said spray boom along said track members, and depending spray heads suspended from said spray boom for irrigating between adjacent rows of palnts, said support means including terminal supports and intermediate supports, said track members being terminally anchored at said terminal supports, and said intermediate supports having cross arms with track member anchors mounted thereon, said drive means including cables extending between said terminal supports on said cross arms having cable engageable rollers mounted thereon, there being four of said cables connected to said spray boom, and each running to one of four of said terminal supports, and a drive unit positioned between each transversely adjacent pair of said terminal supports and adapted to reel in and pay out associated ones of said cables, each drive unit including a drive shaft, a drum carried by said drive shaft, a one way drive connection to said drive shaft, and a brake having a one way connection with said drive shaft for retarding the rotation of said drum.

2. An irrigation system comprising a pair of spaced track members, support means supporting said track members, a spray boom, hangers suspending opposite ends of said spray boom from said track members, drive means connected to said hangers for reciprocating said spray boom along said track members, and depending spray heads suspended from said spray boom for irrigating between adjacent rows of plants, said support means including terminal supports and intermediate supports, said track members being terminally anchored at said terminal supports, and said intermediate supports having cross arms with track member anchors mounted thereon, said drive means including cables extending between said terminal supports on said cross arms having cable engageable rollers mounted thereon, there being four of said cables connected to said spray boom, and each running to one of four of said terminal supports, and a drive unit positioned between each transversely adjacent pair of said terminal supports and adapted to reel in and pay out associated ones of said cables, each drive unit including a drive shaft, a drum carried by said drive shaft, a one way drive connection to said drive shaft, and a brake having a one way connection with said drive shaft for retarding the rotation of said drum, said one way brake connection being mounted in a fixed housing, and said brake being carried by said housing and rideable on a housing rotatable on said shaft and releaseably connected to said shaft by said one way brake connection.

References Cited by the Examiner

UNITED STATES PATENTS

| | | | |
|---|---|---|---|
| 368,841 | 8/1887 | Ligowsky | 239—185 |
| 2,057,217 | 10/1936 | Soper | 239—189 |
| 3,093,312 | 6/1963 | Johnson | 239—185 |

FOREIGN PATENTS

| | | |
|---|---|---|
| 559,064 | 6/1923 | France. |
| 943,200 | 5/1956 | Germany. |
| 216,135 | 11/1941 | Switzerland. |

EVERETT W. KIRBY, *Primary Examiner.*